US006685091B2

(12) United States Patent
Rapp et al.

(10) Patent No.: US 6,685,091 B2
(45) Date of Patent: Feb. 3, 2004

(54) METHOD AND DEVICE FOR INDICATING THE STATE OF EM OR AM SECURITY TAGS

(75) Inventors: Michael Rapp, Modautal (DE); Manfred Rührig, Eckental (DE)

(73) Assignee: Checkpoint Systems International GmbH, Hirschhorn/Neckar (DE)

( * ) Notice: Subject to any disclaimer, the term of this patent is extended or adjusted under 35 U.S.C. 154(b) by 0 days.

(21) Appl. No.: 10/163,242

(22) Filed: Jun. 4, 2002

(65) Prior Publication Data

US 2002/0149197 A1 Oct. 17, 2002

Related U.S. Application Data

(63) Continuation of application No. PCT/EP00/08696, filed on Sep. 6, 2000.

(51) Int. Cl.[7] .......................... G06K 19/06; G06K 7/08

(52) U.S. Cl. ....................... 235/385; 235/449; 235/492

(58) Field of Search ................................ 235/335, 449, 235/492, 375, 383, 486, 488, 487; 206/460, 318

(56) References Cited

U.S. PATENT DOCUMENTS

| | | | |
|---|---|---|---|
| 5,006,000 A | 4/1991 | House | |
| 5,882,116 A | 3/1999 | Backus | |
| 5,975,581 A | 11/1999 | Nicolette et al. | |
| 5,982,282 A | 11/1999 | Ryan, Jr. | |
| 6,255,948 B1 * | 7/2001 | Wolpert et al. | 340/572.8 |
| 6,395,373 B2 * | 5/2002 | Conti et al. | 428/138 |

FOREIGN PATENT DOCUMENTS

| | | |
|---|---|---|
| DE | 43 23 883 A1 | 1/1995 |
| DE | 44 35 695 A1 | 4/1996 |
| DE | 197 10 600 A1 | 9/1998 |
| DE | 197 37 342 A1 | 3/1999 |
| DE | 198 15 583 A1 | 10/1999 |
| EP | 0 354 759 A2 | 2/1990 |
| EP | 0 633 488 A1 | 1/1995 |
| EP | 0 701 233 A1 | 3/1996 |
| EP | 0 783 163 A1 | 7/1997 |
| GB | 2 304 678 A | 3/1997 |
| WO | WO 91/06934 A1 | 5/1991 |
| WO | WO 96/24119 A1 | 8/1996 |
| WO | WO 99/45513 A1 | 9/1999 |
| WO | WO 00/26761 A1 | 5/2000 |

* cited by examiner

*Primary Examiner*—Thien M. Le
(74) *Attorney, Agent, or Firm*—Akin Gump Strauss Hauer & Feld, L.L.P.

(57) ABSTRACT

Devices are disclosed for the display of the "activated" or "deactivated" state of electromagnetic or acousto-magnetic security tags, whereby it is possible to recognize, at a glance, whether the goods, for example on a pallet, have activated or deactivated security tags.

14 Claims, 2 Drawing Sheets

METHOD AND DEVICE FOR INDICATING THE STATE OF EM OR AM SECURITY TAGS

CROSS-REFERENCE TO RELATED APPLICATIONS

This application is a continuation of International Application No. PCT/EP00/08696, filed Sep. 6, 2000, the disclosure of which is incorporated herein by reference.

BACKGROUND OF THE INVENTION

This invention relates to a device for indicating the state of EM or AM security tags and to a method of determining the state of activation of EM or AM security tags.

Security tags of this type are being increasingly used in department stores and warehouses for the electronic surveillance of articles. They are comprised of a strip of a soft magnetic material as, for example, Permalloy or a magnetic glass, which is characterized by high permeability and low coercive force. Arranged parallel thereto and in close vicinity to the strip of soft magnetic material is a strip of a semi-hard or hard magnetic material having a relatively high coercive force as, for example, SEMIVAVC from the Vacuumschmelze company.

In acousto-magnetic (AM) security tags the strip of semi-hard or hard magnetic material is a one-piece construction, while in electromagnetic (EM) security tags it is divided into several sections spatially separated from each other.

In a surveillance zone which preferably is arranged in the entrance or exit area of the department store or warehouse to be protected, an alternating magnetic field is emitted. This alternating field excites the soft magnetic material of the activated security tag into emitting a characteristic signal. This signal is detected by a detecting device sensitive in the frequency range of the signal and evaluated as an identification signal for an article leaving the surveillance zone in unauthorized manner; an alarm is released.

The detecting device should cease to respond to the security tag once the merchandise has been rightly purchased. Therefore, the security tag is deactivated after proper purchase of the article. In cases where EM security tags are involved, this is accomplished by driving the semi-hard or hard magnetic strip into saturation, its magnetization hence suppressing a response of the soft magnetic material to the alternating magnetic field in the surveillance zone. With AM security tags, deactivation is accomplished, for example, by demagnetizing the semi-hard or hard magnetic strip.

Typically, security tags are affixed in deactivated state to the goods or their packaging already at the point of manufacture. These goods are subsequently packaged or transferred to pallets for distribution. To simplify merchandise logistics, it should not be necessary in future to remove the articles from their packaging or pallets for activation, but rather, activation should take place in a one-step operation for all the safety tags contained in a packaging or on a pallet.

For the operator of a department store in which the articles are to be sold it is of eminent importance to have reliable knowledge of the state—activated or deactivated— of the security tags. If articles with deactivated security tags reach the sales floor, the entire electronic article surveillance system is useless. However, the state of the security tags cannot be read from the tags directly.

BRIEF SUMMARY OF THE INVENTION

It is an object of the present invention to provide a device which indicates simply and reliably the state of one or several security tags.

According to the present invention, this object is accomplished by a device for indicating the state of EM security tags or AM security tags, comprising a first semi-hard or hard magnetic layer and a second layer arranged in close vicinity thereto, wherein said second layer is sensitive to magnetic fields.

This device has the advantage that, when affixed to a packaging or a pallet, its first layer adopts the same state of magnetization as the semi-hard or hard magnetic layer of the security tags contained in the packaging or on the pallet. In consequence, from the magnetization state of the first layer of the device a conclusion can be drawn as to the activated or deactivated state of the security tags in the packaging or on the pallet. The second, magnetically sensitive layer of the device enables the magnetization state of the first layer to be inspected visually, thereby obviating the need to provide measuring devices for measuring the magnetization state.

In one embodiment of the invention the second layer is comprised of a ferrofluid, so that with the first layer in a magnetized state the magnetic particles suspended in the fluid concentrate in the zone of high magnetic field strength. This effects a color change of the zones. Where the magnetic field is weak, the number of magnetic particles decreases, producing overall a distinct contrast between the zones with a strong magnetic field and the zones where the magnetic field is weak. This contrast enables the state of the security tags to be determined.

When the device of the invention is utilized to indicate the state of EM security tags, the presence of a contrast in the second layer is indicative of deactivated EM security tags. In the case of acousto-magnetic (AM) security tags the presence of a contrast in the second layer indicates that the AM security tags are activated.

In one variant of the invention provision is made for enclosing the second layer between two plates and a circumferential frame to prevent the ferrofluid from escaping and to make sure that the device of the invention operates reliably regardless of the position.

As a provision supplementary to the invention, at least one of the plates, in particular the plate arranged on the side of the second layer opposite the first layer, is transparent to enable the viewer of the device to see at a glance whether or not there is a contrast.

In a further embodiment of the invention, the second layer is comprised of a magneto-optically active material so that the optical properties, in particular the refractive index, of the second layer changes when the first layer is magnetized. By illuminating the second layer with polarized light, for example, the changes in the optical properties due to the existing magnetic field can be made visible, which enables the state of the security tags to be clearly established also when these materials are employed.

In one embodiment of the invention the second layer is comprised of a film material which affords flexibility and economy of manufacture of the device of the invention.

Further embodiments provide for the first layer to be composed of several sections and for the first layer or the sections to be in the form of letters or figures. This enables a plain text to become visible in the second layer when the security tags or the device of the invention is magnetized. This plain text may read, for example, “deactivated” to indicate the state of EM security tags, or “activated” to indicate the state of AM security tags.

As another provision supplementary to the invention, a carrier layer is arranged between the first layer and the second layer to increase the mechanical strength of the device of the invention.

One embodiment of the invention provides for the first layer and the second layer to be in essentially parallel arrangement to each other so that the optical changes of the second layer resulting from the degree of magnetization of the first layer are equal over the entire dimension of the second layer.

In an advantageous embodiment of the invention the device includes elements for fastening to a packaging or a pallet so that it can be fastened simply and securely to these shipping containers. These elements can be of the type including an eyelet, a hook, an adhesive or the like.

The object initially referred to is also solved by a method of determining the state of activation of EM or AM security tags which includes the steps of

- attaching a device for indicating the state of EM or AM security tags to a packaging or a pallet containing merchandise equipped with EM or AM security tags,
- simultaneously activating or deactivating all the security tags in the packaging or on the pallet and the device for indicating the state of EM or AM security tags in a device for activating or deactivating security tags, and
- establishing the state of activation of the EM or AM security tags in the packaging or on the pallet by reading the device for indicating the state of EM or AM security tags.

This method has the advantage of enabling the state of all security tags present in close spatial proximity to the device to be detected by reading a device for indicating the state of EM or AM security tags. This results in an increased safety of the electronic article surveillance system. Activating the security tags and the indicating device simultaneously requires activators/deactivators whose magnetic fields are sufficiently strong to activate or deactivate all security tags and the indicating device at the same time.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
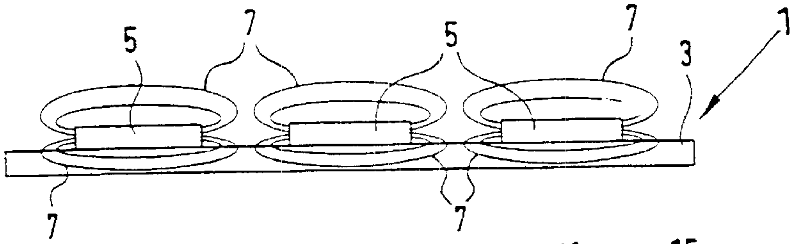
FIGS. 1a–1c are views of a deactivated EM security tag (FIG. 1a), and a side view (FIG. 1b) and a top plan view (FIG. 1c) of a first embodiment of a device of the invention.

FIG. 1a shows a deactivated EM security tag 1. The EM security tag 1 is comprised of a strip 3 of a soft magnetic material. Arranged in close proximity to the strip 3 are three sections 5 of a semi-hard or hard magnetic material. The sections 5 are magnetized as shown by field lines 7. Considering that the field lines 7 penetrate also the strip 3, the EM security tag 1 does not emit a characteristic signal when moved into an alternating magnetic field. This means that the security tag 1 is deactivated.

Figure 1B:
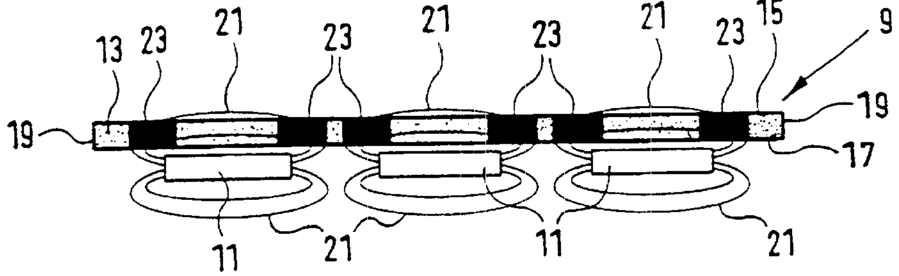

FIG. 1b shows an invention device 9 for indicating the state of EM security tags in a side view. The device 9 is comprised of sections 11 of a semi-hard or hard magnetic material. The magnetic properties of the sections 11 are similar to those of the sections 5 of the EM security tag 1. This can be assured by the use of the same material, in particular the material referred to in the foregoing. Arranged above the sections 11 is a ferrofluid 13. To prevent the ferrofluid 13 from escaping, it is enclosed between two plates 15 and 17 and a circumferential frame 19.

The ferrofluid 13 is a transparent liquid, for example, in which magnetic particles are suspended. The field lines 21 penetrating the ferrofluid 13 act on the magnetic particles of the ferrofluid 13, such that the magnetic particles move to the zones exhibiting a high magnetic field strength. The locally different concentration of the magnetic particles in the ferrofluid 13 produces dark sections 23 in the ferrofluid 13.

Figure 1C:
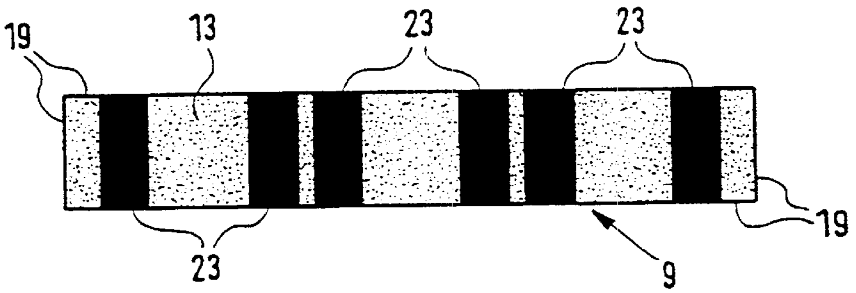

FIG. 1c shows a device 9 of the invention in a top plan view. In this view the dark sections 23 are clearly discernible. The presence of the dark sections in the ferrofluid 13 can be utilized as information on the state of the device 9, that is, the state of the EM security tags 1 located in close proximity to the device 9. The sections 11 of the device 9 may be suitably shaped to represent letters, figures or symbols instead of the bar-shaped dark sections 23. For example, the word "deactivated" or a similar statement could be made to appear in the ferrofluid 13.

It will be understood, of course, that a statement on the state of neighboring EM security tags 1 is only possible if the device 9 and the EM security tags 1 have the same prior history. Hence it is possible, for example, to affix a device 9 for indicating the state of EM security tags to a pallet or the like on which a plurality of goods, each provided with an EM security tag, are stacked. In this event the device 9 provides reliable information on whether the EM security tags contained on the pallet are in activated or deactivated state.

Figure 2A:
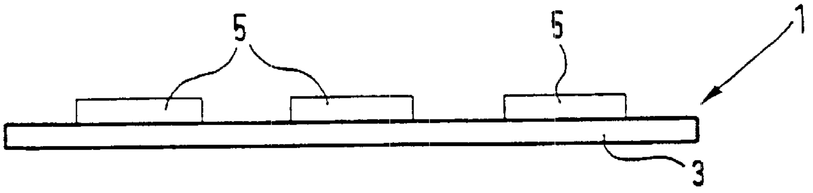
FIGS. 2a–2c are views of the same arrangement in activated condition.

FIG. 2a shows the same arrangement as FIG. 1a. The difference is that the sections 5 are demagnetized so that no magnetic field is present around the sections 5. In consequence, the strip 3 is able to emit a characteristic signal when moved into a corresponding alternating magnetic field. The security tag 1 is hence activated.

Figure 2B:
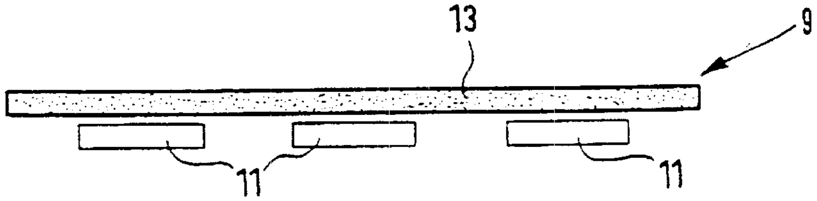
Figure 2C:
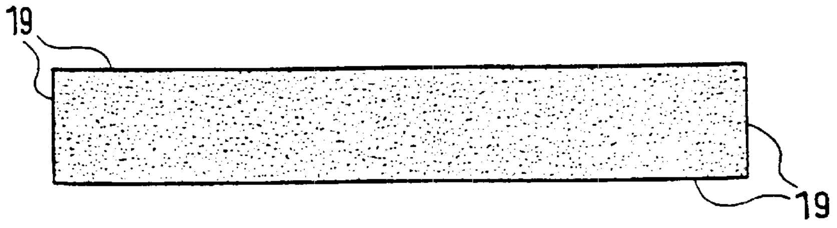

In demagnetized condition there is also no magnetic field present around the sections 11 of the device 9 so that the magnetic particles schematically shown as dots are uniformly distributed in the ferrofluid 13. In the top plan view presented in FIG. 2b the device 9 is hence shown with a uniformly colored area. This appearance signals the viewer that the EM security tags 1 are activated. Reading the state of EM security tags from the device 9 is facilitated when the plate 15 bounding the ferrofluid 13 in upward direction is of the transparent type.

The possibility also exists to substitute a layer of a magneto-optically active material for the ferrofluid 13, whose optical properties change under the influence of a magnetic field. By visualizing the change in optical properties, for example, by irradiation with polarized light, information on the state of the security tags is equally obtainable as in the use of a ferrofluid 13.

Figure 3A:
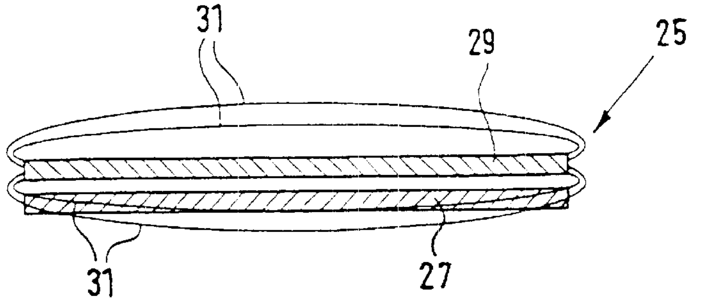
FIGS. 3a–3c are views of an activated AM security tag (FIG. 3a), and a side view (FIG. 3b) and a top plan view (FIG. 3c) of a device of the invention.
Figure 3B:
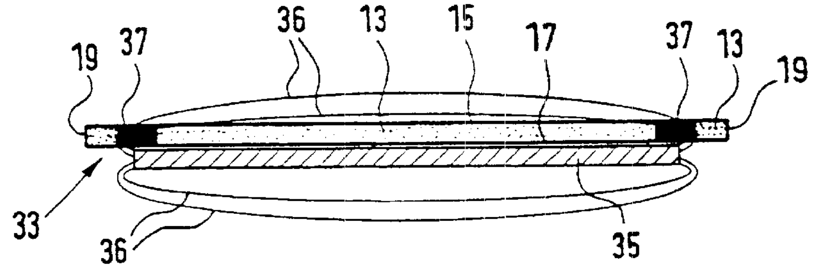

FIG. 3a shows an acusto-magnetic (AM) security tag 25. It is comprised of a soft magnetic strip 27 and a semi-hard or hard magnetic strip 29. In FIG. 3*a* the semi-bard magnetic strip 29 is magnetized so that a magnetic field indicated by field lines 31 is present around it. These field lines 31 penetrate the soft magnetic strip 27, activating the AM security tag 25. Illustrated in FIG. 3*b* below the AM security tag 25 is a second device 33 of the invention. Arranged in close proximity to a strip 35 of semi-hard or hard magnetic material, whose properties at least approximate to being similar to those of the strip 29, is a ferrofluid 13 which is enclosed by plates 15 and 17 and a circumferential frame 19. The magnetic field emanating from the strip 35 is shown schematically by the field lines 36. The magnetic particles of the ferrofluid 13 accumulate at sites of high magnetic field strength, causing the ferrofluid 13 to become colored in these zones. These colorings are shown as dark sections 37 in the ferrofluid 13.

Figure 3C:
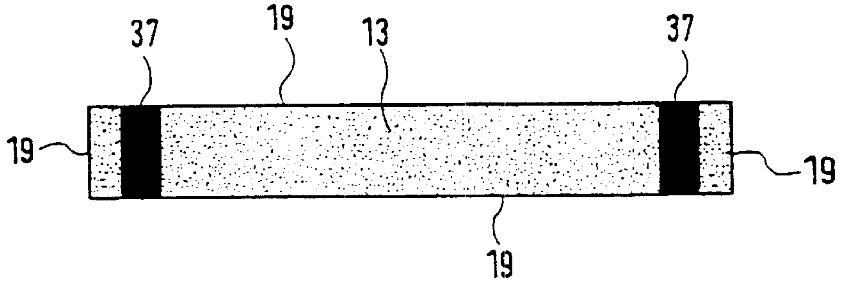

FIG. 3*c* shows a device 33 of the invention in a top plan view. In this view the dark sections 37 are discernible as black bars. By giving the strip 35 a suitable shape, it is of course also possible to produce not only dark sections 37 in the form of bars but to visualize letters, figures or other characters.

In the state shown in FIG. 3*a* the AM security tag is activated so that, given a corresponding configuration of the device of the invention, the dark sections 37 can be configured such that the work "activated" becomes visible for the viewer of the device 33.

Figure 4A:
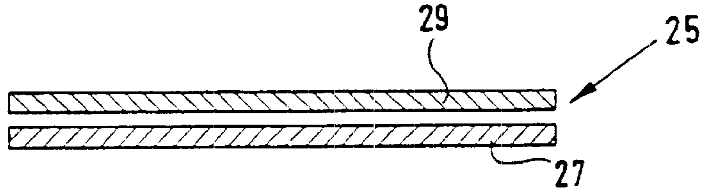
FIGS. 4a–4c are views of the security tag and the device of FIGS. 3a–3c in deactivated condition.
Figure 4B:
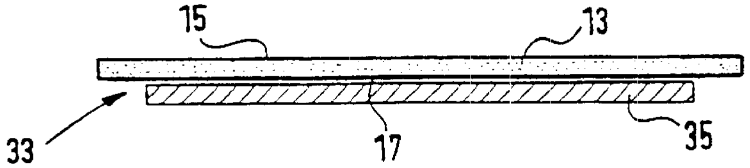
Figure 4C:
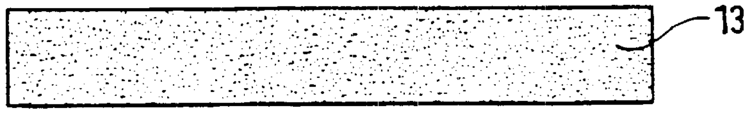

FIG. 4*a* shows in the upper part an AM security tag 25 comprised of a soft magnetic strip 27 and a semi-hard or hard magnetic strip 29. The strip 29 is not magnetized, hence the absence of field lines. The semi-hard or hard magnetic strip 35 of the device 33 for indicating the state of AM security tags, which has undergone the same treatment as the AM security tag 25, is likewise demagnetized. Therefore, the magnetic particles are uniformly distributed in the ferrofluid 13. In the top plan view of FIG. 4*b* the ferrofluid 13 is a uniformly colored area indicative of deactivated security tags 25.

It is noted that all the features represented in the description, the subsequent claims and the drawings can be essential to the invention, whether taken alone or in any combination.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for indicating a magnetization state of an EM security tag (1) or an AM security tag (25), comprising a first semi-hard or hard magnetic layer (11) and a second layer (13) arranged in close vicinity thereto, wherein said second layer (13) is sensitive to magnetic fields and configured such as to enable the magnetization state of the first layer (11) to be determined visually.

2. The device as claimed in claim 1, characterized in that the second layer (13) is comprised of a ferrofluid.

3. The device as claimed in claim 2, characterized in that the second layer (13) is enclosed between two plates (15, 17) and a circumferential frame (19).

4. The device as claimed in claim 2, characterized in that at least one of the plates (15, 17) is one of the transparent type.

5. The device as claimed in claim 3, characterized in that the plate (15) arranged on the side of the second layer (13) opposite the first layer (11) is of the transparent type.

6. The device as claimed in claim 1, characterized in that the second layer (13) is comprised of a magneto-optically active material.

7. The device as claimed in claim 1, characterized in that the second layer (13) is comprised of a film material.

8. The device as claimed in claim 1, characterized in that the first layer (11) is composed of several sections.

9. The device as claimed in claim 8, characterized in that the first layer (11) or the sections are in the form of letters or figures.

10. The device as claimed in claim 1, characterized in that a carrier layer is arranged between the first layer (11) and the second layer (13).

11. The device as claimed in claim 1, characterized in that the first layer (11) and the second layer (13) are in essentially parallel arrangement to each other.

12. The device as claimed in claim 1, characterized by elements for fastening to a packaging or a pallet.

13. A method of determining the state of activation or deactivation of EM or AM security tags, characterized by the steps of

- attaching a device (9, 33) for indicating the state of EM or AM security lags (1, 25) to a packaging or a pallet containing merchandise equipped with EM or AM security tags (1, 25),
- simultaneously activating or deactivating all the security tags (1, 25) in the packaging or on the pallet and the device (9, 33) for indicating the state of EM or AM security tags (1, 25) in a device for activating or deactivating security tags (1, 25), and
- establishing the state of activation or deactivation of the EM or AM security tags (1, 25) in the packaging or on the pallet by reading the device (9, 33) for indicating the state of EM or AM security tags (1, 25), which enables the activation or deactivation state of the EM or AM security tags to be determined visually.

14. The method as claimed in claim 13, characterized in that the device (9, 33) for indicating the state of EM or AM security tags (1, 25) is a device (9, 33) according to claim 1.

* * * * *